UNITED STATES PATENT OFFICE.

ROBERT C. ROBERTSON, OF WARWICK EAST, BERMUDA.

REMEDY FOR DISEASES OF THE SKIN OR SCALP AND PROCESS OF MAKING SAME.

SPECIFICATION forming part of Letters Patent No. 711,263, dated October 14, 1902.

Application filed July 3, 1902. Serial No. 114,285. (No specimens.)

*To all whom it may concern:*

Be it known that I, ROBERT C. ROBERTSON, a subject of the King of Great Britain and Ireland, residing in Warwick East, Bermuda, have invented certain new and useful Improvements in Remedies for Diseases of the Skin or Scalp and Processes of Making Same, of which the following is a specification.

This invention relates to an improved preparation for the cure of diseases of the skin and scalp—such as eczema, ringworm, dandruff, &c.—which can also be used to great advantage for reinvigorating the roots of the hair and prevent it from falling out; and for this purpose the invention consists of a process of making said preparation by evaporating sea-water by heat, subjecting the concentrated liquid obtained from the same to a low temperature, so as to separate by crystallization a part of the magnesium sulfate and a part of the sodium and potassium chlorids, next drawing off the liquor from the precipitate, redissolving the magnesium sulfate and adding the liquor, and adding, lastly, a small quantity of acetic acid to the solution.

The invention consists, further, of a liquid preparation for the cure of diseases of the skin and scalp, which consist of a solution in water of magnesium chlorid, sodium chlorid, potassium chlorid, magnesium sulfate, magnesium bromid, and acetic acid.

In preparing my improved liquid solution for curing diseases of the skin and scalp sea-water is first evaporated at a high temperature—80° to 90° Fahrenheit—in the same manner as sea-water is evaporated for obtaining salt for commercial purposes. When in concentrated state, it is subjected to a low temperature—35° to 45° Fahrenheit—for a period of approximately five days, so that a part of the magnesium sulfate and parts of the sodium and potassium chlorid contained in the same are separated by crystallization. The upper half of this precipitate consists chiefly of sodium and potassium chlorids, and these are separated from the magnesium sulfate, which is redissolved in a sufficient quantity of water and returned to the residual liquor after the same has been drawn off from the precipitate. To this liquor a small quantity of acetic acid is added, which should, however, not be more than five parts in one hundred parts of the solution. The liquid thus obtained contains the following ingredients in solution—namely, magnesium chlorid, sodium chlorid, potassium chlorid, magnesium sulfate, magnesium bromid, and acetic acid—and forms a very effective lotion for curing diseases of the skin and scalp. It is used by rubbing a quantity of the same into the skin and letting the same dry on the same. It forms also an effective stimulant to the action of the skin, arrests the falling out of the hair and improves the growth of the same, and forms a very effective remedy for ulcer, eczema, ringworm, eruptions, and similar diseases of the skin or scalp.

Having thus described my invention, I claim as new and desire to secure by Letters Patent—

1. The process herein described of making a skin and scalp preparation, which consists in concentrating sea-water of the ordinary composition, cooling the concentrated water, separating the sodium and potassium chlorids and magnesium sulfate contained in the resulting precipitate from the residual liquor, separating said magnesium sulfate from the said chlorids, dissolving the magnesium sulfate in water, adding the solution to the residual liquor, and then adding to the mixture a small quantity of acetic acid, substantially as set forth.

2. The process herein described of making a skin and scalp preparation, which consists in concentrating sea-water of the ordinary composition, cooling the concentrated water, separating the sodium and potassium chlorids and magnesium sulfate contained in the resulting precipitate from the residual liquor, separating said magnesium sulfate from the said chlorids, dissolving the magnesium sulfate in water, adding the solution to the residual liquor, and then adding to the mixture approximately five per cent. of acetic acid, substantially as set forth.

3. The process herein described of making a skin and scalp preparation, which consists in concentrating at a temperature of 80° to 90° Fahrenheit sea-water of the ordinary composition, cooling the concentrated water at a temperature of 35° to 45° Fahrenheit for a period of about five days, separating the sodium and potassium chlorids and magnesium sulfate contained in the resulting precipitate from the residual liquor, separating said magnesium sulfate from the said chlorids, dissolving the magnesium sulfate in water, adding the solution to the residual liquor, and then adding to the mixture approximately five per cent. of acetic acid, substantially as set forth.

4. The herein-described skin and scalp preparation, consisting of a concentrated mixture of sea-water from which a portion of the sodium and potassium chlorids have been removed, together with a small quantity of acetic acid, substantially as set forth.

In testimony that I claim the foregoing as my invention I have signed my name in presence of two subscribing witnesses.

ROBERT C. ROBERTSON.

Witnesses:
W. H. WOLFF,
W. J. RICHARDSON.